United States Patent [19]
Pitsch

[11] Patent Number: 6,062,251
[45] Date of Patent: May 16, 2000

[54] WATER VALVE FOR FAUCET FITTING

[75] Inventor: Walter Pitsch, Franklin Park, N.J.

[73] Assignee: American Standard Inc., Piscataway, N.J.

[21] Appl. No.: 09/061,790

[22] Filed: Apr. 16, 1998

[51] Int. Cl.[7] .................................................. F16K 11/20
[52] U.S. Cl. ..................... 137/270; 137/454.6; 137/606; 137/625.31
[58] Field of Search .............................. 137/625.31, 270, 137/454.6, 606

[56] References Cited

U.S. PATENT DOCUMENTS

| | | | |
|---|---|---|---|
| 3,674,048 | 7/1972 | Manoogian et al. | 137/270 |
| 3,831,621 | 8/1974 | Anthony et al. | 137/625.31 |
| 3,929,317 | 12/1975 | Cohn et al. | 251/227 |
| 3,964,514 | 6/1976 | Manoogian et al. | 137/625.17 |
| 3,967,811 | 7/1976 | Keller, III | 251/175 |
| 3,998,240 | 12/1976 | Liautaud | 138/375 |
| 4,015,817 | 4/1977 | Argyris et al. | 251/288 |
| 4,064,904 | 12/1977 | Tolnai | 137/454.5 |
| 4,089,347 | 5/1978 | Christo | 137/625.41 |
| 4,331,176 | 5/1982 | Parkison | 137/625.31 |
| 4,387,880 | 6/1983 | Saarisalo et al. | 251/285 |
| 4,651,770 | 3/1987 | Denham et al. | 137/625.31 |
| 4,751,943 | 6/1988 | Chi | 137/625.31 |
| 4,903,725 | 2/1990 | Ko | 138/454.5 |
| 4,924,903 | 5/1990 | Orlandi | 137/625.31 |
| 5,010,917 | 4/1991 | Iqbal | 137/454.6 |
| 5,326,075 | 7/1994 | Goff | 251/285 |
| 5,355,906 | 10/1994 | Marty et al. | 137/98 |

FOREIGN PATENT DOCUMENTS

| | | |
|---|---|---|
| 0443 300 | 8/1991 | European Pat. Off. . |
| 0035 056 | 9/1991 | European Pat. Off. . |
| 0450 582 | 10/1991 | European Pat. Off. . |
| 0505 326 | 9/1992 | European Pat. Off. . |
| 3510 908 | 10/1985 | Germany . |

*Primary Examiner*—Stephen Hepperle

[57] ABSTRACT

A faucet fitting system having interchangeable components useable in both single handle and dual handle faucet fixtures. The component system is designed to allow the same putty plate with breast plate, waterway spout, aerator and mounting nuts to be used with the various escutcheons, metering valves and waterways associated with the single handle and dual handle faucet fixtures. Specially constructed water valves, putty plates and escutcheon constructions useable in conjunction with the system are also disclosed.

14 Claims, 16 Drawing Sheets

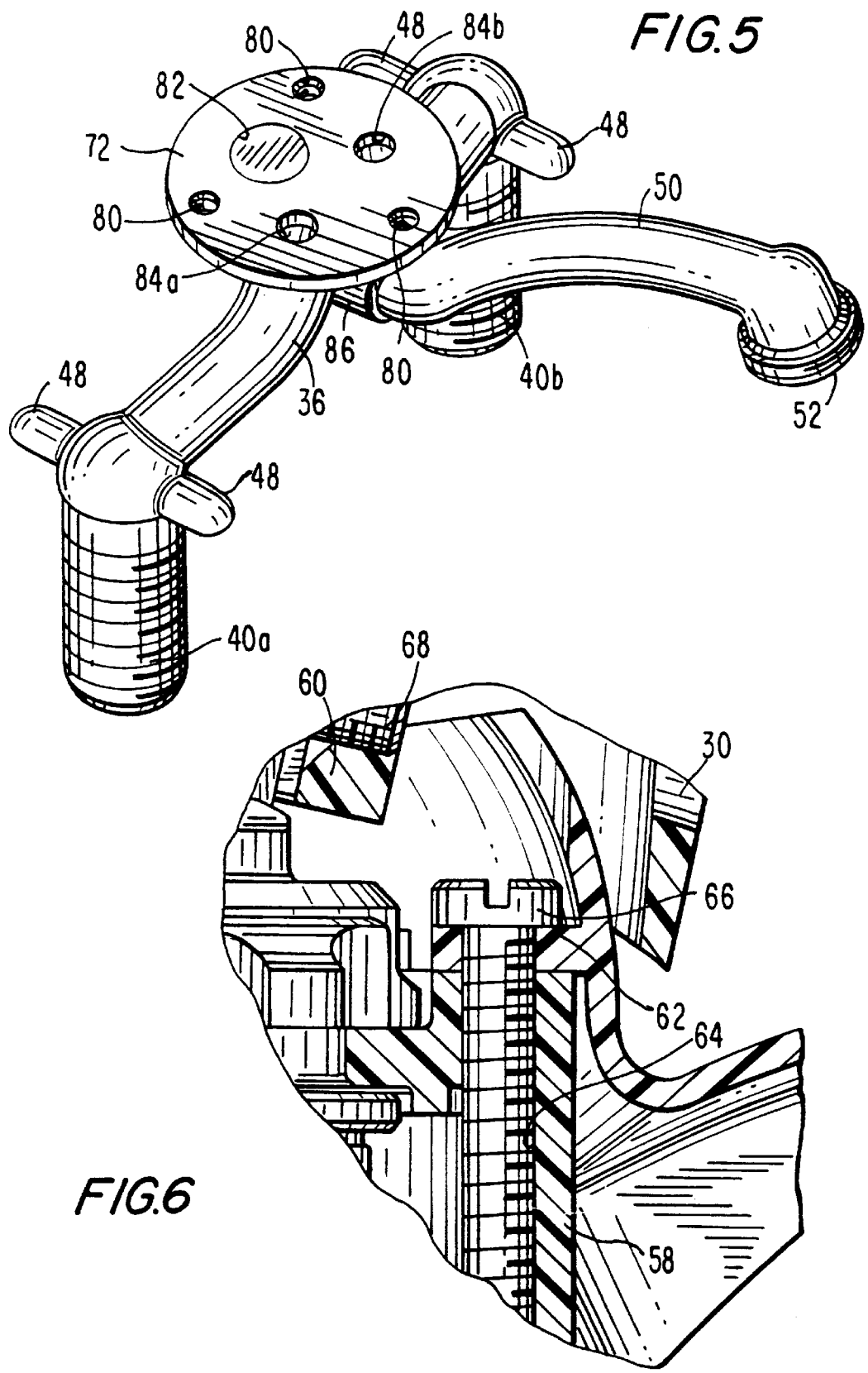

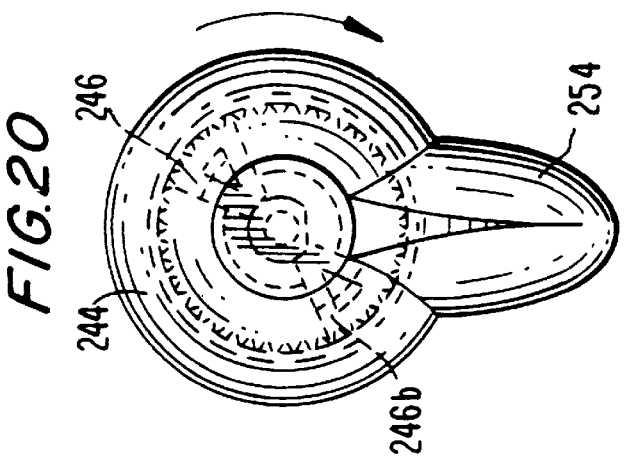
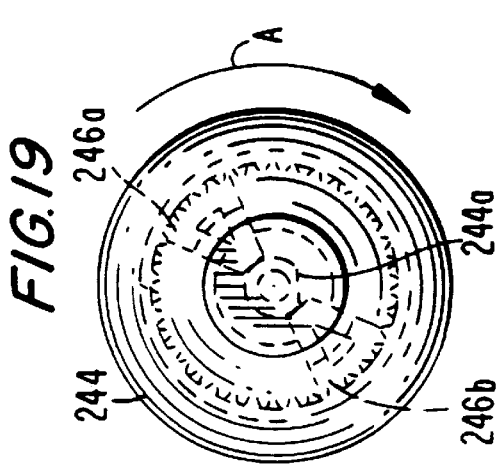
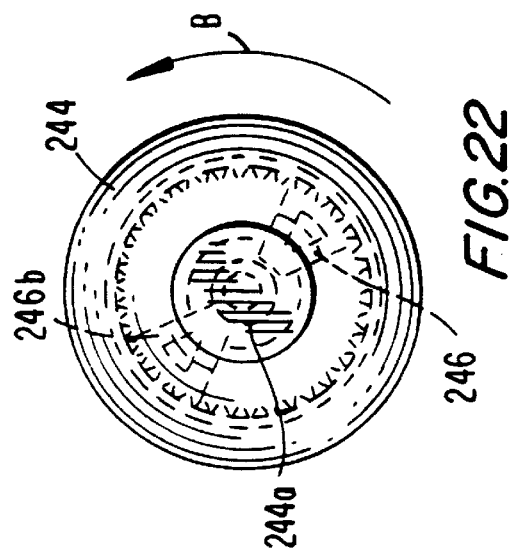
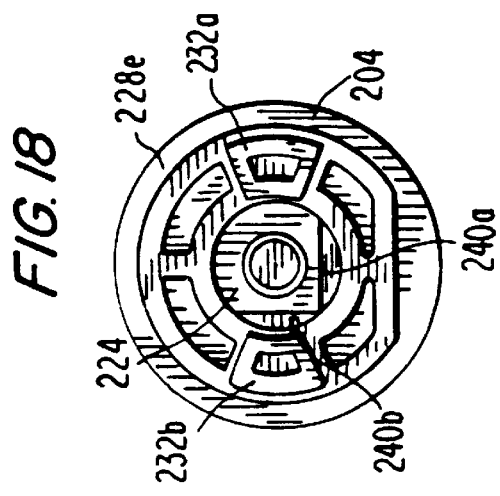
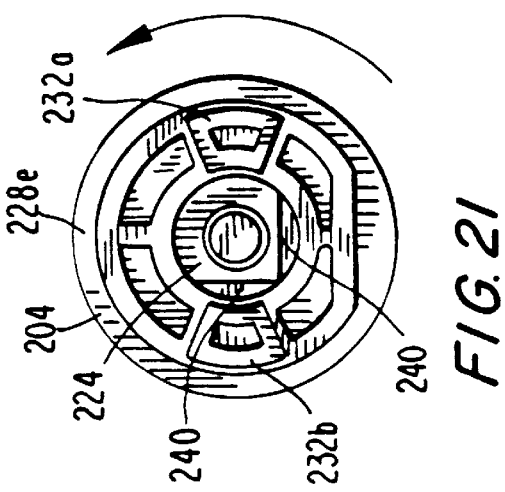

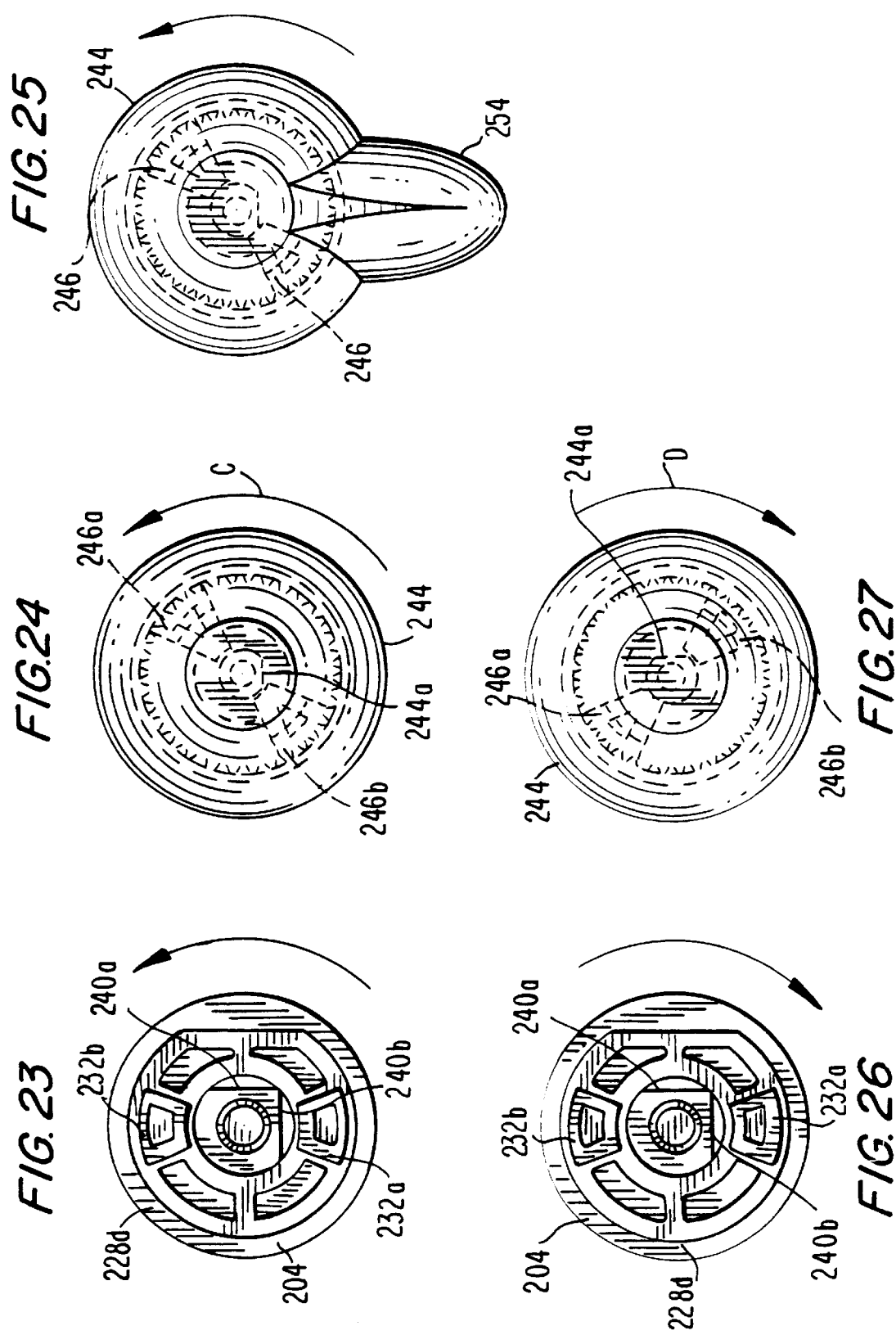

WATER VALVE FOR FAUCET FITTING

BACKGROUND OF THE INVENTION

The present invention relates generally to a novel plumbing fitting component system adapted to both single handle and dual handle faucets and certain novel plumbing fixture components, and more particularly, to single handle and dual handle faucet fitting constructions with interchangeable components and improved adaptability. The faucets can be installed easily, and maintained generally from above the faucet deck, permit various component parts to be used with either single handle or dual handle faucets, may include an escutcheon in the single handle model that also functions as a cartridge cover, may include an adjustable putty plate, and may include a low-cost valve in the dual handle model which allows for selective on-off control.

Conventional faucet installations are generally time-consuming and difficult to install and maintain because many of the fastening members must be attached and turned from below a sink deck, at times requiring the plumbing contractor installing the fixture to work in extremely cramped quarters. After installation, the same difficult process must be followed to remove and replace the faucet. In the faucet fixture construction of the present invention and the method of installing that fixture, the fixture is inserted into openings in a sink deck and substantially installed from above except for nut-tightening from below the deck. Furthermore, the construction allows for easy maintenance of most serviceable parts from above the sink deck, thus avoiding these difficulties.

Conventional faucet fixtures can be constructed to use separate hot and cold water valves in a dual handle form or can be constructed to use a valve cartridge controller mixing both hot and cold water in a single handle form. Generally these two constructions require entirely separate component parts and little overlap is possible, thus requiring a large cost in manufacturing. In the component system of the present invention, at least the putty plate with breast plate, the waterway spout and aerator and the mounting nuts can each be used with the different escutcheons, metering valves, and waterway paths associated with either a single handle or a dual handle faucet fixture, thus minimizing the costs of manufacturing and the difficulty in assembling the various fixtures.

Conventional single handle faucet fixtures generally include a separate cartridge cover or retaining screw to keep the valve cartridge in place. This can add to the cost of manufacturing as well as create an undesired aesthetic appearance. Furthermore, since a cartridge cover or mounting screw is easily accessible, it allows unwanted tampering with the faucet. In the component system of the present invention, an escutcheon is provided for the single handle model that also functions as a cartridge cover without requiring any separate cover component, and yet conceals the access point to the valve cartridge from casual inspection while still providing easy maintenance.

Conventional faucet fixtures generally include a putty plate forming a seal between the sink deck and the escutcheon base. However, due to manufacturing tolerances and slight differences in the heights of various components, sometimes a gap may remain between the escutcheon and the putty plate, or between the putty plate and the sink deck. Typically, when installing a faucet, therefore, bolts are attached directly to the escutcheon from underneath the sink deck to attach it firmly to the putty plate and sink deck. In addition to requiring an additional difficult installation step and requiring difficult maintenance, the mounting bolts put an undesirable stress on the escutcheon. In the putty plate of the present invention, the periphery of the putty plate includes a flange with a resilient bowed portion and a ridge for mating with the escutcheon base despite differences in the height of the escutcheon over the sink deck, thus providing an effective seal using a simple installation procedure and eliminating any undesirable stress on the escutcheon.

Conventional dual handle faucet fixtures generally require two valves, one each for controlling the hot and cold water. In many cases, it is desired to turn the two valves in opposite directions when opening the flow of water. In other cases, the faucets are turned in the same direction which may be clockwise or counterclockwise, as desired. This change in rotating control direction usually requires a complicated and expensive manufacturing and installation process because valves are typically designed to be turned on in one direction only. In the valve of the present invention, the handle may selectively be turned in either clockwise or counterclockwise directions to open the valve by merely attaching the handle in one of two predefined positions during installation. Furthermore, the valve is inexpensive to manufacture and easier to install than typical valves, and may, for example, have a valve housing formed entirely of plastic. Moreover, the present invention allows the same handle construction and valve construction, and a single waterway to allow operation in opposite directions on the hot and cold water sides. This construction also allows ready changeover between faucet handles and faucet levers.

Accordingly, it is desired to provide a fixture system having components which can be used in both single handle faucets and dual handle faucets, and having improved components which allow for interchangeability and other advantages.

SUMMARY OF THE INVENTION

Generally speaking, in accordance with the present invention, a faucet fixture system having components usable in both single handle and dual handle faucets and associated other components, is provided. The system includes a faucet fixture component system wherein the same putty plate with attached breast plate, waterway spout and mounting nuts can be used with the different escutcheons, metering valves, and waterways associated with either the single handle or the dual handle faucet fixtures.

The components of the present invention include a waterway with a manifold and downward extending waterway inlets which are adapted to extend through mounting openings on a sink deck and thereafter be connected to water supplies. The waterway manifold has a spout joint and a connected spout with a nozzle. A putty plate is positioned intermediate the sink deck and the faucet. The waterway also includes at least one valve receiving portion and at least one escutcheon mounting portion near or common to each valve receiving portion. Each valve receiving portion in an assembled fixture is sealingly connected to a metering valve for controlling the flow of water through the waterway and spout.

The components further include an escutcheon with a base portion generally covering the waterway and a spout portion generally covering the waterway spout. The escutcheon includes at least one escutcheon opening generally corresponding to each valve receiving portion when the fixture is assembled for providing access to the corresponding valve. The escutcheon opening may also include a retaining portion which retains the metering valve in fixed position when the fixture is assembled. The escutcheon also includes at least one waterway mounting portion near each escutcheon opening. Each waterway mounting portion is engaged with a corresponding escutcheon mounting portion thus fixing the escutcheon to the waterway.

A putty plate with attached breast plate portion in accordance with the invention includes a substantially flat member that provides mating contact between the base of an escutcheon and a sink deck. The putty plate has apertures corresponding to the mounting openings in the sink deck and fastening members adjacent to the apertures. The waterway has mounting portions which loosely engage with the fastening members to provide relative positioning of the putty plate, the waterway and the mounting openings when the fixture is assembled.

The putty plate also has a ridge and a flange near the outside periphery which engage the escutcheon base to provide relative positioning of the escutcheon, the putty plate and the waterway when the fixture is assembled. The flange includes a resilient bowed portion that can adjust to differences in the distance between the escutcheon base and the sink deck.

The fixture component system is assembled in the manner disclosed. The putty plate is set on the waterway so that the waterway inlets extend through the putty plate apertures. In this position, the waterway nozzle will extend through a nozzle orifice on the breast plate portion of the putty plate. The waterway and the putty plate are fastened to the sink deck. The spout is connected at the spout joint of the manifold. The inlets extending through the putty plate are inserted from on top of the sink deck through the sink deck mounting openings so as to extend below the sink deck so that the waterway mounting portions engage the putty plate fastening members. A metering control valve is secured on the manifold of the waterway. The escutcheon is placed over the waterway and spout, engaging the putty plate, and the escutcheon is fastened to the waterway to generally enclose the waterway and spout within the escutcheon, and putty plate with breast plate. The metering valve is retained in place with a corresponding escutcheon opening retaining portion.

A single handle faucet fixture in accordance with the present invention includes a manifold with a cartridge receiving portion and an escutcheon mounting portion near it. The cartridge receiving portion supports a metering valve cartridge and the escutcheon has a corresponding opening which includes a retention portion which retains the cartridge in place without the need for an additional cap or mounting screw. The escutcheon opening also allows easy access to the metering valve cartridge.

An associated water valve of the present invention for use in a dual handle faucet fixture includes a stationary valve body in fluid communication with, and positioned intermediate an upper waterway and a lower waterway. The body includes a fluid inlet and fluid outlets, and a rotatable drive shaft. The drive shaft has a handle mount, and controls a rotating disk with blocking members and cutouts which control fluid communication with the fluid outlets.

A stationary disk having apertures cooperates with the rotating disk. The rotating disk and stationary disk rotate against each other and allow the cutouts to expose the apertures when the shaft is rotated to a first position to open a fluid flow between the lower waterway and upper waterway, and to allow blocking when the shaft is rotated to a second position to inhibit the water flow. The shaft is rotated between the first and second positions by rotating a handle on the handle mount, thus controlling the water flow through the valve.

The valve body also includes projections which cooperate with stops in the handle to limit rotation and allow for either clockwise or counterclockwise action to turn the faucet on or off.

In such a valve as described, when the handle is rotated clockwise, the shaft is rotated to a first maximum open position when the blocking member is attached to the handle mount in a first position. When the handle is attached to the handle mount in a second orientation, the shaft is rotated to the maximum open position when the blocking member is attached to the handle mount in the second position located at 90° relative to the first position. By mounting the hot water valve at a 90° rotation with respect to the cold water valve, the on-off direction of rotation for both the hot and cold sides can be easily changed by simply reorienting the handle on the handle mount.

Furthermore, the valve housing and drive shaft can be made substantially of plastic and requires no metal parts, yet is resilient and reliable in extended use.

Accordingly, it is an object of the present invention to provide a sink component system wherein certain component parts can be used in faucet fixtures of both single and dual handle construction.

Another object of the present invention is to provide a faucet fixture construction that can easily be installed and generally maintained from above a sink deck.

A further object of the present invention is to provide an escutcheon for a single handle faucet fixture with an integrated cartridge cover thereby avoiding the need for a separate cartridge cover or mounting nut.

Still another object of the present invention is to provide a putty plate between the waterway and the sink deck that attaches to the waterway and engages an escutcheon base for providing relative positioning between the sink deck, waterway and escutcheon.

Still a further object of the present invention is to provide a putty plate having a ridge and a flange wherein the flange has a resilient bow portion for adjusting to differences in the height of the escutcheon base over the sink deck.

A still figurer object of the present invention is to provide a single handle control waterway as a one piece casting.

Yet still another object of the present invention is to provide a dual handle faucet in which clockwise and counterclockwise handle rotation operation can be achieved with a single valve construction, a single handle construction and a single waterway construction.

Yet another object of the present invention is to provide a low cost valve that can easily be installed to turn on a water flow in a clockwise direction or to selectively turn on a water flow in a counterclockwise direction.

Still other objects and advantages of the invention will in part be obvious and will in part be apparent from the following detailed specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is a top front left perspective view of a single handle faucet waterway constructed in accordance with the present invention;

FIG. 6 is an enlarged partial sectional view of a portion of the single handle faucet fixture in accordance with the present invention;

FIGS. 18 through 27 each show detailed top plan views of the valve of FIG. 14 and a handle showing the relationship of both in different configurations in accordance with the present invention;

DETAILED DESCRIPTION OF THE PREFERRED EMBODIMENTS

Figure 1:
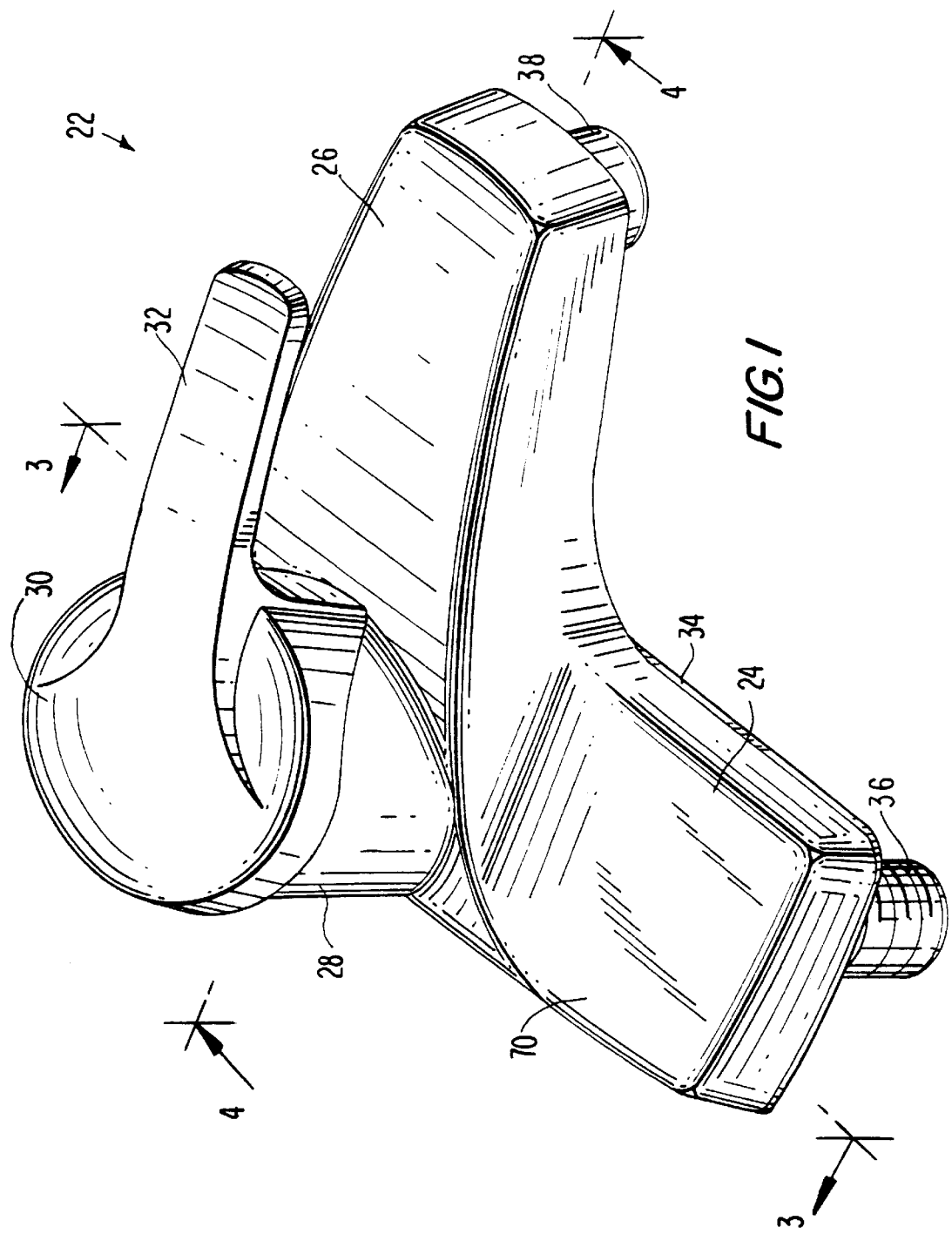
FIG. 1 is a top front left perspective view of a single handle faucet fixture constructed in accordance with the present invention.

Referring first to FIGS. 1 through 9 of the drawings, a fixture component system of the present invention includes a single handle faucet fixture shown generally at 22 in three dimensional perspective view in accordance with the invention viewed from the top front left position. FIG. 1 shows an assembled faucet fixture 22. Fixture 22 includes an escutcheon 70 in the form of a finished fixture body having an escutcheon base portion 24 and an escutcheon spout portion 26. In the embodiment shown, at the base of escutcheon spout portion 26, where it joins with escutcheon base portion 24, there is an upwardly extending cartridge housing portion 28. Escutcheon base portion 24, escutcheon spout portion 26 and cartridge housing portion 28 together form escutcheon 70 for generally covering the internal plumbing components of the faucet and providing a finished appearance thereto.

Cartridge housing portion 28 is covered by a lever cap 30 which, in the embodiment shown, includes a lever handle 32. Escutcheon 70 is fixed with respect to an internal waterway 36 of faucet fixture 22 as described more fully in detail below.

Figure 2:
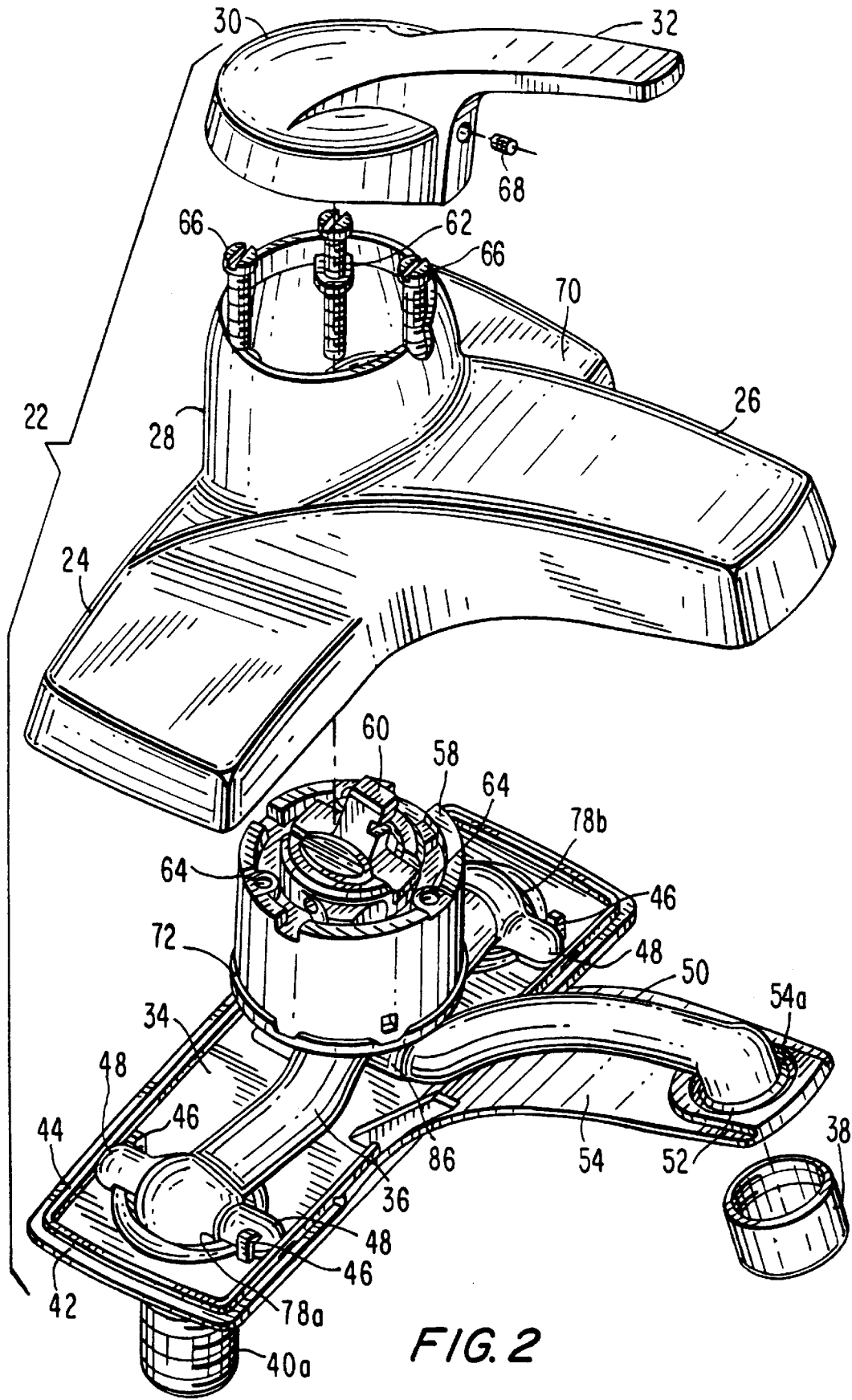
FIG. 2 is a top front left exploded view of the single handle faucet fixture depicted in FIG. 1.

Interposed between escutcheon 70 and a sink deck 74 (shown in FIG. 3), and in mating relationship to both, there is a putty plate 34 preferably formed from a resilient plastic material, which, along with escutcheon 70 defines a substantially closed chamber generally enclosing the internal plumbing components to be described more fully below. FIG. 2 shows an exploded view of fixture 22 and depicts the relationship between the internal plumbing components, escutcheon 70 and putty plate 34.

Figure 3:
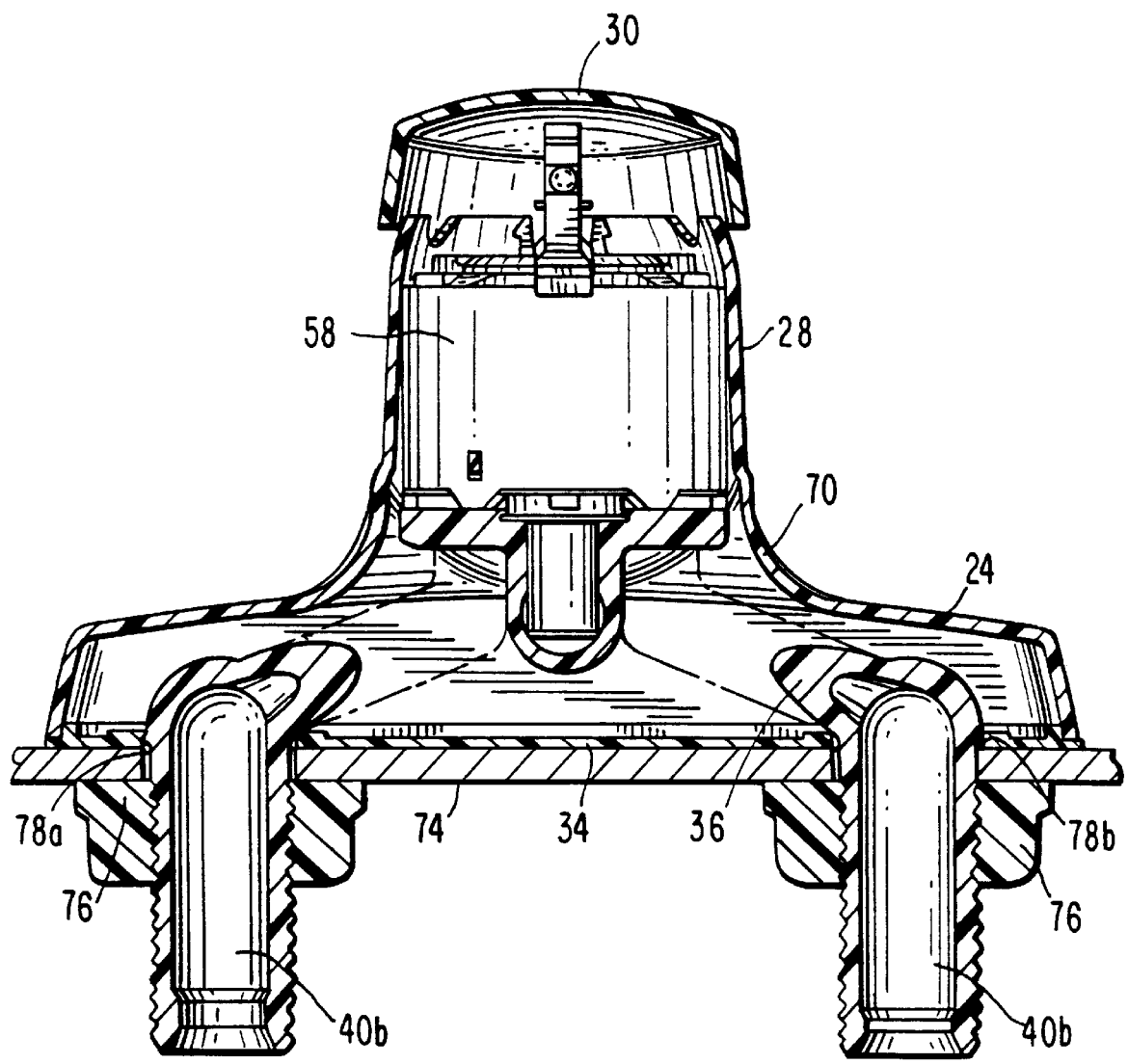
FIG. 3 is a sectional view taken along line 3–3 of FIG. 1.
Figure 4:
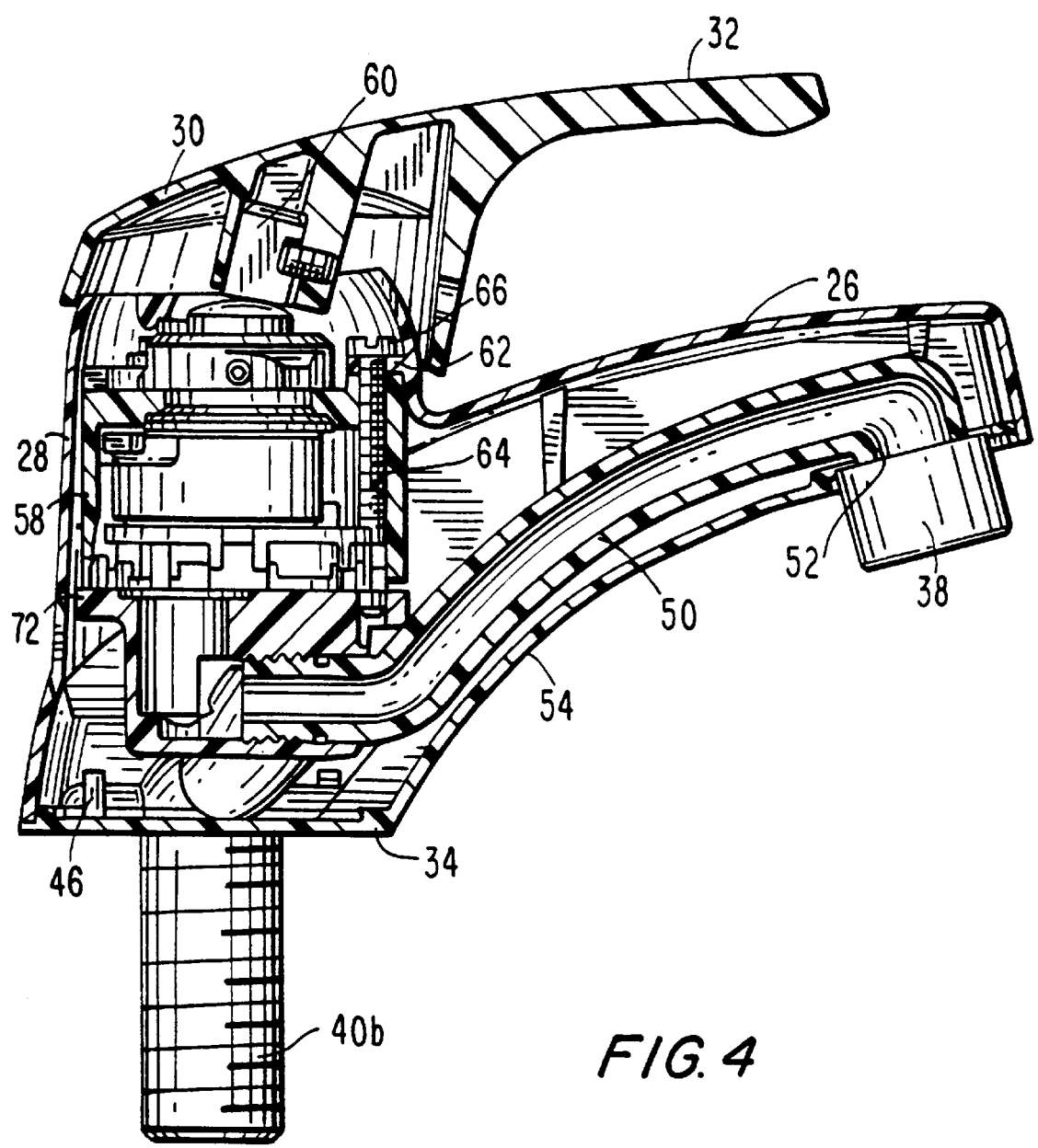
FIG. 4 is a sectional view taken along line 4–4 of FIG. 1.

FIG. 3 shows waterway 36 fixed to sink deck 74 by mounting nuts 76 which engage an external surface of hot and cold waterway inlets 40a and 40b in a like manner typically used for dual handle fixtures (and described more fully below). In general, it is noted that prior art single handle fixtures typically braze copper tubing waterway inlets to a separate manifold unit, and must often provide separate fixation bolts in the escutcheon to secure the fixture to the sink deck with mounting nuts. Applicant's invention is much easier to fabricate, install and more rugged because only the waterway is a one piece casting and is attached through the deck to the underside of a sink, thus minimizing the stress on the escutcheon which covers the waterway. Furthermore, most faucet maintenance can be accomplished from above the sink deck by simply removing escutcheon 70.

Intermediate waterway 36 and sink deck 74 there is a seal for protecting the inside plumbing of fixture 22 from water which may accumulate on sink deck 64 and to provide a finished appearance thereto. In the present invention, the seal is formed by a putty plate 34. Putty plate 34 includes a putty plate flange 42 extending around its periphery and generally arranged to correspond with the shape of escutcheon base portion 34. Putty plate 34 also includes a putty plate ridge 44 set just inside the periphery of flange 42 and defining putty plate flange 42. Ridge 44 is generally adapted to correspond with the inside bottom walls of escutcheon base portion 24 in a manner such that putty plate 34 is fitted closely to escutcheon 70 when fixture 22 is assembled. Putty plate 34 has two putty plate apertures 78a and 78b adapted to correspond to the position of waterway inlets 40a and 40b and the corresponding mounting openings on sink deck 74.

Figure 9:
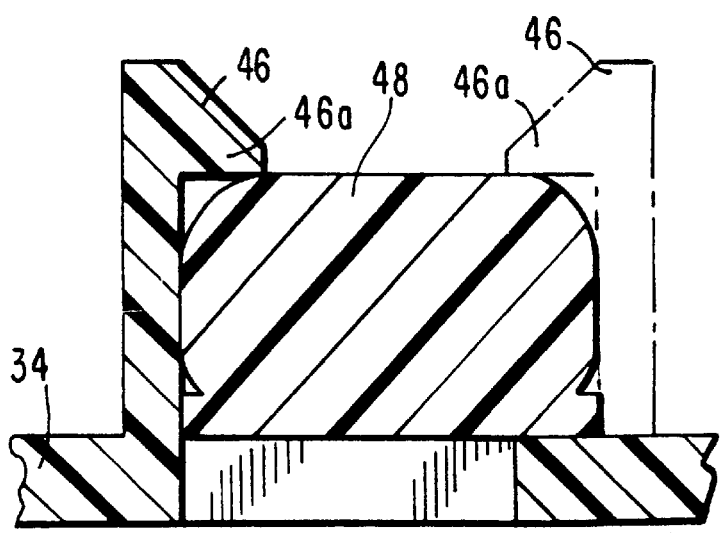
FIG. 9 is an enlarged sectional view taken along line 9–9 of FIG. 7.
Figure 10:
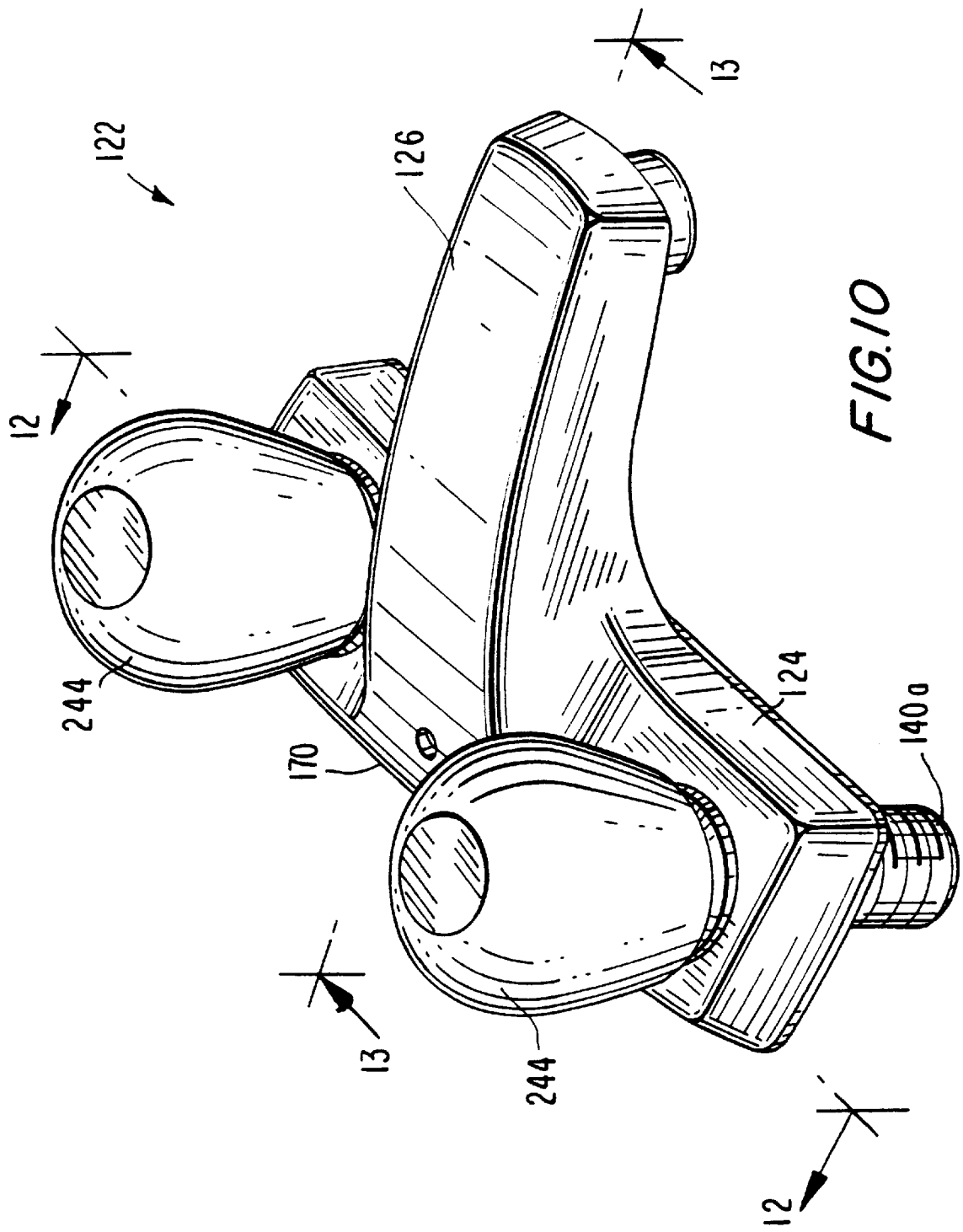
FIG. 10 is a top front left perspective view of a dual handle faucet fixture constructed in accordance with the present invention.

Putty plate 34 is also loosely supported on waterway inlets 40a and 40b by means of opposing offset fastening members or tabs 46. As best seen in FIG. 9, fastening members 46 loosely engage with waterway mounting portion extensions or wings 48 which are integral with and extend outwardly from waterway inlets 40a and 40b at a location generally just above sink deck 74. Waterway mounting portion extensions 48 engage with fastening members 46 by means of a projection 46a in a manner which generally allows some play in the precise relative positioning of waterway 36 and putty plate 34 before final installation and tightening. Waterway mounting portion extensions 48 are positioned on waterway inlets 40a and 40b at a location which sets the height-wise positioning of waterway 36 with respect to sink deck 74. It should be noted that fastening members 46 and waterway mounting portion extensions 48, while shown as clips and tabs, respectively, are merely one preferred embodiment for positioning waterway 36, putty plate 34 and sink deck 74 with respect to one another, and additional fastening embodiments are easily envisioned by one of ordinary skilled in the art.

Likewise, putty plate ridge 44 and putty plate flange 42 engage with the lower rim of escutcheon base 24 in a manner which allows some play between the relative positioning of escutcheon base 24 and putty plate 34 before final installation and tightening. Waterway inlets 40a and 40b extend through putty plate apertures 78a and 78b which correspond to mounting holes in sink deck 74.

To install fixture 22 on sink deck 74, putty plate 34 is positioned on waterway 36, aligning putty plate apertures 78a and 78b so that waterway inlets 40a and 40b extend therethrough. Waterway 36 with attached putty plate 34 is positioned over the sink deck so that waterway inlets 40a and 40b extend through the mounting holes of sink deck 74. Fastening members 46 of putty plate 34 are engaged with waterway mounting portions 48 so that the combined waterway and putty plate can be installed together.

Waterway 36 and putty plate 34 are secured to sink deck 74 by screwing mounting nuts 76 to the threads formed on the outer surface of the downward by extending portions of waterway inlets 40a and 40b under sink deck 74 as best shown in FIG. 3.

Waterway 36 includes an attachable waterway spout 50 having at its end a waterway nozzle 52. Waterway inlets 40a and 40b are connected to a manifold 72 which is integrally formed as part of waterway 36. This unique construction of the present invention allows the same attachable waterway spout construction to be used with both single and dual handle fixtures. Furthermore, the waterway may be unitarily formed from cast brass or other metal.

As shown, putty plate 34 includes a breast plate portion 54 which is adapted to fit in mating relationship to the bottom of the inside walls of escutcheon spout portion 26, thus forming a chamber when assembled. Waterway spout 50 also joins with manifold 72 and extends generally up and away from sink deck 74 in a manner adapted to fit within the chamber formed by breast plate portion 54 and escutcheon spout portion 26 when fixture 22 is assembled. An aerator 38 is attached to waterway nozzle 52 and fixes the nozzle end portion of breast plate portion 54 to waterway nozzle 52.

A single handle control cartridge 58 is positioned on top of manifold 72 which is adapted to allow water from waterway inlets 40a and 40b to be mixed, metered and directed to waterway spout 50 in a known manner for providing a selectable flow amount of hot and/or cold water. The selection of the flow amount and mix of hot and/or cold water is controlled by means of a cartridge controller 60 fixed to cartridge 58. Cartridge controller 60 also acts as a handle mount for handle 32. Cartridge 58 typically is arranged with various chambers selectively placed in fluid communication with waterway inlets 40a and 40b and waterway spout 50. Cartridge 58 may be a conventional ceramic plate single handle fixture cartridge such as is well known in the art.

Cartridge 58 is adapted to fit within cartridge housing portion 28 when escutcheon base portion 24 is engaged with putty plate 34 and escutcheon spout base 26 is engaged with breast plate portion 54. Cartridge 58 rests on manifold 72 and cartridge housing 28 rests on cartridge 58. In order to sealingly fix cartridge 58 to manifold 72 and attach cartridge housing portion 28 to cartridge 58, cartridge housing portion 28 is provided with escutcheon mounting tabs 62 and cartridge 58 is provided with corresponding cartridge mounting portions in the form of through openings 64. In this embodiment, cartridge fasteners 66 are screwed passing through holes in escutcheon mounting tabs 62 and cartridge mounting portions 64. The screws are matingly engaged with threaded manifold openings 80 in the top of manifold 72. It is noted that cartridge fastener 66 may be any suitable means for fixing cartridge housing 28 to cartridge 58, and cartridge 58 may be fixed to manifold 72, by any suitable additional means, or may be fixed by the same means as is used to fix cartridge housing 28 to cartridge 58, as depicted in the embodiment shown.

When assembled, fixture 22 is supported on sink deck 74. However, unlike conventional fixtures, waterway 36 is the only component directly secured to sink deck 74. During assembly or manufacture, cartridge 58 is set on manifold 72, and cartridge fasteners 66 align it in proper position in order to allow the cartridge chambers be in selected fluid communication with waterway inlets 40a and 40b and waterway spout 50, thus allowing regulation of the flow of water.

In the embodiment shown, the fastening of cartridge 58 to manifold 72 is accomplished by the same means used to fasten cartridge housing portion 28 to cartridge 58. Thus, escutcheon 70 is fixed to waterway 36 by fixing cartridge 58 to manifold 72 and escutcheon mounting portions 62 to cartridge 58 through cartridge mount portions 64.

Escutcheon 70 is set over cartridge 58, escutcheon spout portion 26 is set over waterway spout 50, and escutcheon base portion 24 is set generally over waterway inlets 40a and 40b and is matingly engaged with putty plate 34 by means of putty plate ridge 44 and putty plate flange 42. As described more fully below, putty plate flange 42 is pressed towards the bottom of the walls of escutcheon base portion 24, thus forming the matingly engaging relationship thereto and providing the desired seal.

Breast plate portion 54, which is formed as part of putty plate 34 as shown in this embodiment, is in a matingly engaging relationship with the bottom of the inside walls of escutcheon spout 26 and may be held in place by, for example, being interposed between aerator 38 and waterway nozzle 52 when aerator 38 is attached to waterway nozzle 52. An opening 54a in breast plate portion 54 allows a portion of nozzle 52 to extend therethrough.

Lever cap 30 is adapted to fit over cartridge housing portion 28 to allow smooth relative movement between lever cap 30 and cartridge housing portion 28. Lever cap 30 is secured to cartridge controller 60 by means of a lever handle fastener 68, which in the embodiment shown, is a set screw. Lever cap 30 is secured to cartridge control 60 in such a manner that by controlling lever handle 32, lever cap 30 can be rotated or slid over cartridge housing 28 thereby rotating or sliding cartridge controller 60 and opening or shutting one or more of the cartridge chambers, thereby mixing water from either or both waterway inlets 40a and 40b and allowing water to flow through waterway spout 50 and waterway nozzle 52.

When installing fixture 22, mounting nuts 76 are not tightened all the way against sink deck 64 at first thus allowing some play in the relative positions of putty plate 34 and waterway 36. Once all of the components of fixture 22 are properly aligned, mounting nuts 76 can be tightened to sink deck 74, thus fixing in place putty plate 34 and waterway 36.

Manifold 72 includes manifold spout opening 82 and manifold inlet openings 84a and 84b. Manifold inlet openings 84a and 84b correspond with waterway inlets 40a and 40b and provide fluid communication between waterway 36 and chambers in cartridge 58. Manifold 72 also has a spout joint 86 integrally fixed on the underside of manifold 72 and connecting with manifold spout opening 82 to provide fluid communication with chambers in cartridge 58. Waterway spout 50 is attached to waterway 36 by spout joint 86 and is in fluid communication with manifold spout opening 82.

In the embodiment shown, waterway spout 50 has a threaded joint end which matingly engages with threads on the interior wall of spout joint 86. Manifold openings 80 are also threaded in this embodiment and are adapted to matingly engage with cartridge screws 66 for affixing escutcheon 70 to cartridge 58, and cartridge 58 to manifold 72.

As described above, escutcheon mounting portions 62 of escutcheon 70 rests upon and is fixed to cartridge 58 which rests upon and is fixed to manifold 72 of waterway 36 which is fixed to sink deck 74. Due to manufacturing tolerances in producing each of these components of fixture 22, the height of escutcheon 70 will vary with relation to sink deck 74. It is desirable that escutcheon base 34 mate in a sealing relationship to putty plate 34 and that putty plate 34 mate in a sealing relationship to sink deck 74. Thus, it is desirable that the height of escutcheon base portion 24 over sink deck 74 be slightly less than the thickness of putty plate 34 above sink deck 74. When assembled, escutcheon base portion 24 presses against putty plate flange 42.

Figure 7:
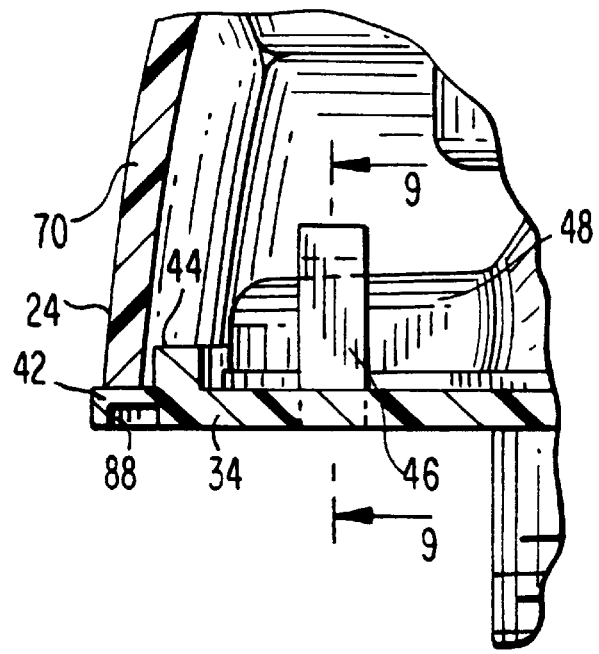
FIG. 7 is an enlarged partial sectional view showing a detail of the putty plate and escutcheon orientation in the present invention.
Figure 8:
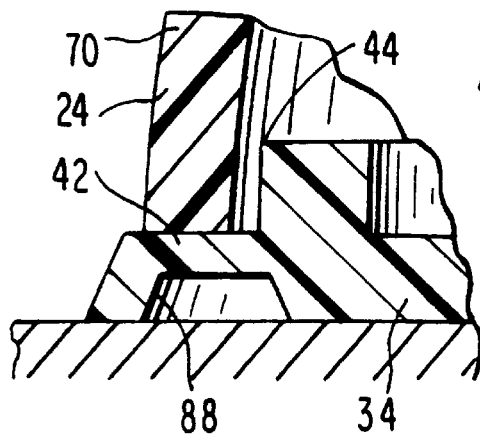
FIG. 8 is an enlarged sectional view of a portion of FIG. 7 showing the escutcheon pressed against the putty plate.

Putty plate flange 42 includes a bowed or recessed portion 88 in the form of a channel as best seen in FIGS. 7 and 8 to provide a resilient mating seal between putty plate 34 and escutcheon 70. In this manner, escutcheon base portion 24 presses against bowed portion 88 which causes it to flex slightly to accommodate any irregularities in escutcheon base portion 24 or the sink deck. Thus, if the tolerances are met, when escutcheon mounting portions 62 mate with cartridge 58 then the bottom edge of escutcheon base portion 24 should be closer to sink deck 74 than the thickness of putty plate 34. In order to accommodate this spacing, bowed portion 88 flexes downwardly to accommodate escutcheon base portion 24 and provide the desired sealingly mated relationship.

The single handle faucet component construction described above provides a one piece cast waterway construction heretofore not found in single handle faucets. The escutcheon body is coupled only to the waterway, not to the deck itself. The escutcheon body acts as the cartridge cover itself. As described below, the same putty plate with breast plate, mounting nuts, waterway spout and aerator may be used in the alternative embodiment of the single handle faucet as well as in the dual handle embodiment.

Figure 28:
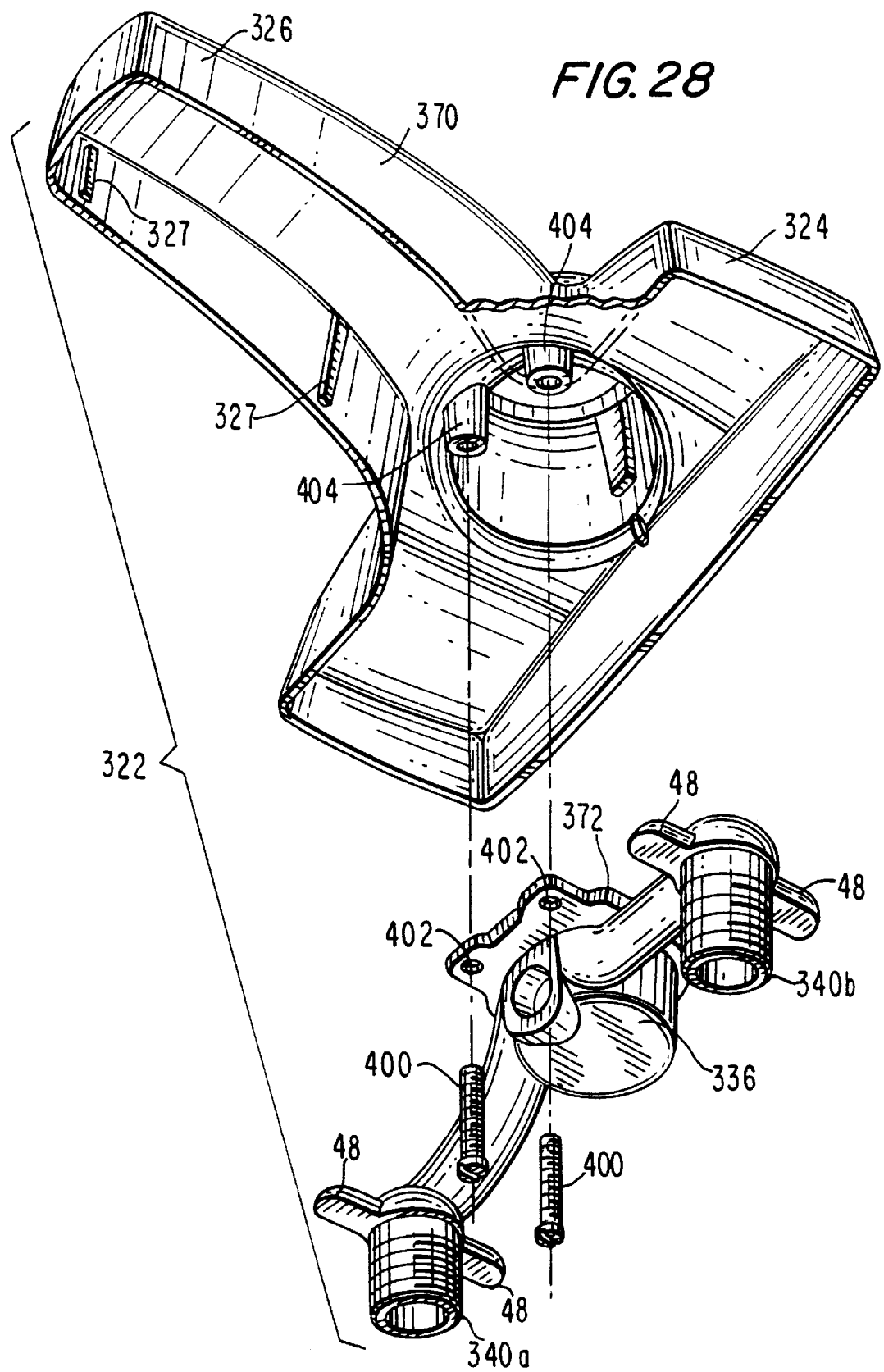
FIG. 28 is an exploded view of an alternative embodiment of a single handle faucet fixture in accordance with the present invention.
Figure 29:
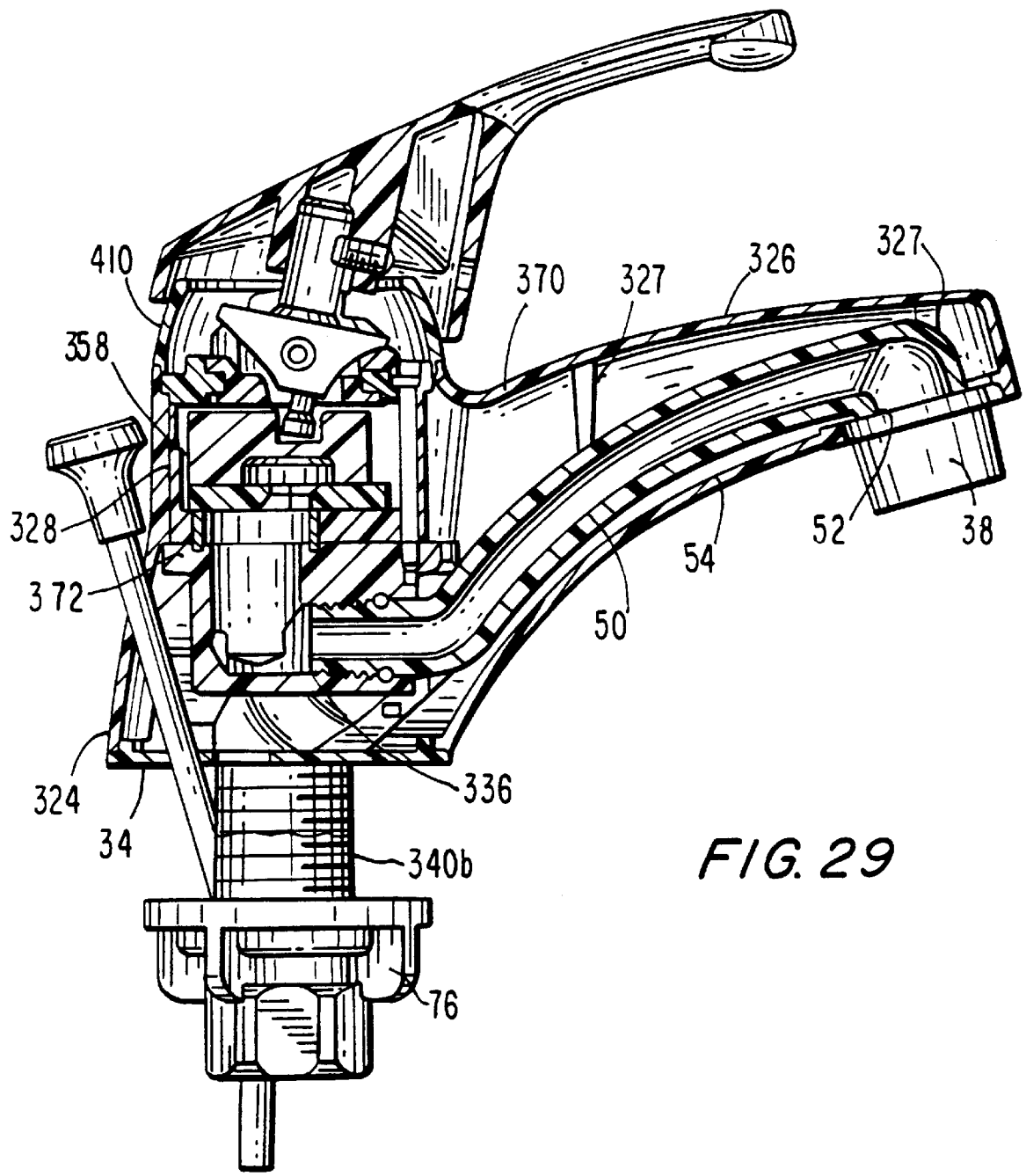
FIG. 29 is a sectional view similar to FIG. 4, but showing the assembly according to FIG. 28.

FIGS. 28 and 29 depict an alternate embodiment of a single handle faucet shown generally at 322 constructed in accordance with an alternative embodiment of the present invention. Faucet 322 includes an escutcheon 370 having a base portion 324 and a spout portion 326. A waterway 336 includes waterway inlets 340*a* and 340*b* and mounting portion extensions 48. The same putty plate 34 described above may be used in conjunction with faucet 322. In this regard, it is noted that internal ribs 327 on opposite sides of the internal surface of spout portion 326 help prevent breast plate portion 54 of putty plate 34 from being pushed inwardly.

In the embodiment of FIGS. 28 and 29, valve cartridge 35 is separately secured to manifold 372 with several through screws. Escutcheon 370 is separately coupled to the waterway using screws 400 which extend through holes 402 in manifold 372 and are threaded into bosses 404 formed on the underside of escutcheon 370. Due to the low profile of cartridge housing portion 328, a separate snap on cap 410 is provided to cover the upper portion of the valve cartridge.

Reference is now made to FIGS. 10 through 13 which depict an embodiment of a dual handle faucet fixture generally shown at 122 constructed in accordance with the dual handle embodiment of the present invention. Fixture 122 includes an escutcheon body 70 having an escutcheon base portion 124 and an escutcheon spout portion 126. Escutcheon base portion 124 and escutcheon spout portion 126 together form escutcheon 170 for covering the internal plumbing components of the faucet and providing a finished appearance thereto. Escutcheon 170 is fixed with respect to an internal waterway 136 as described more fully below. Putty plate 34 is disposed between escutcheon 170 and sink deck 74 and in mating relationship to both. Putty plate 34, which is of the same construction as used in the single handle faucet construction discussed above, together with escutcheon 170, defines a generally closed chamber enclosing the internal plumbing components.

Waterway 136 is fixed to sink deck 74 by threaded mounting nuts 76 which engage with the external threaded surfaces of waterway inlets 140*a* and 140*b*. A seal is formed intermediate waterway 136 and sink deck 74 for protecting the inside plumbing of fixture 122 from water which may accumulate on sink deck 74, and to provide a finished appearance thereto. In the present invention, this seal is formed by putty plate 34 which is the same putty plate 34 used in the single handle faucet construction described above.

Putty plate 34 is also affixed to waterway inlets 140*a* and 140*b* by means of putty plate fastening members 46. Fastening members 46 engage with waterway mounting portions 148 which are integral with and extend from waterway inlets 140*a* and 140*b* at a location generally just above sink deck 74 as in the single handle faucet construction.

Assembly of fixture 122 onto sink deck 74 is the same as described above with respect to the single handle faucet assembly.

Waterway 136 includes waterway spout 50 having the same construction as in the single handle faucet embodiment. Waterway spout 50 is a separate component and joins with waterway 136 through a spout joint 186. Spout joint 186 threadingly engages waterway spout 50 in the same manner as discussed above. In this manner, the same spout component may be used for both single handle and dual handle faucet fixtures because the individual respective waterways 36 and 136 each include a respective spout joint 86 and 186 which positions waterway spout 50 with respect to escutcheon spout portions 26 and 126 and over the bowl of a sink. Spout joint 186 is connected to and is in fluid communication with waterway inlets 140*a* and 140*b*.

In the dual handle faucet depicted in FIGS. 10–13, water valves 202 are used to separately control the flow of hot and cold water. Valve 202 is a low cost, sanitary valve constructed and adapted to fit in respective valve receiving portions 204 of waterway 136. Valve 202 is interposed within waterway 136, and when in a first, open position, maintains fluid communication between waterway inlets 140*a* and 140*b* and waterway spout 50.

Valve 202 is retained in place by a valve nut 205. Valve nut 205 is fixed to a corresponding portion of valve receiving portion 204 by, for example, being threadingly engaged thereto. Interposed between valve receiving portion 204 and valve nut 205 is a valve gasket 207. The combination of valve gasket 207 and valve nut 205 not only retains valve 202 within valve receiving portion 204, but also acts to secure escutcheon 170 to waterway 136.

Valve receiving portion 204 has a design which permits the flow of fluid through the bottom from waterway inlets 140a and 140b, to a side water outlet which permits the flow of fluid to waterway spout 50. Valve 202 includes a valve housing 228 adapted to fit within valve receiving portion 204. Valve housing 228 is sealingly engaged to valve receiving portion 204 with a valve housing gasket 230, set in a corresponding groove 228a in valve housing 228. Valve housing 228 includes recessed opposing outlet portions 236 which are open to the side and are in fluid communication with waterway spout 50. Valve housing 228 also includes opposing projections 229 which fit in corresponding slots 204a in valve receiving portion 204 to prevent rotation of the valve housing and to properly orient and position the valve housing.

Figure 14:
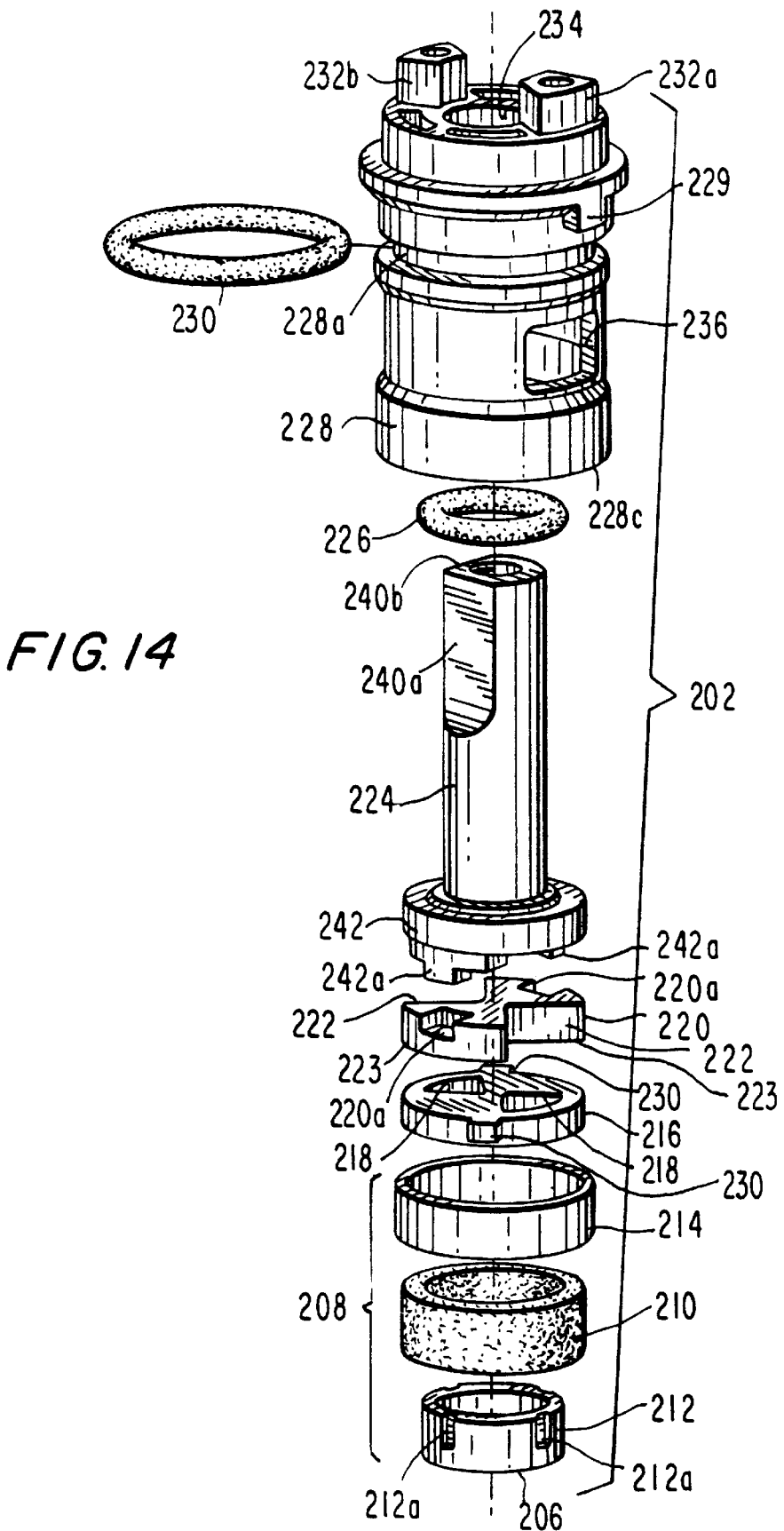
FIG. 14 is an exploded view of a single control water valve for use in a dual handle faucet constructed in accordance with the present invention.

As shown in detail in FIGS. 14–7, valve housing 228 also includes a shaft bearing portion 234 on the upper portion thereof which holds and aligns a drive shaft 224 along the central axis of valve housing 228. Drive shaft 224 includes a shaft gasket 226 which fluidly seals drive shaft 224 against valve housing 228 while permitting drive shaft 224 to rotate about its central axis within bearing portion 234. The bottom of drive shaft 224 includes T-shaped projections 242 each having a leg 242a which fits in a corresponding slot 220a in a bone-shaped rotating disk 220.

Rotating disk 220 is preferably a ceramic plate although other materials may be used. Rotating disk 220 includes opposing cutout regions 222 and opposing solid regions 223. Rotating disk 220 is pressed against a stationary disk 216, which is also preferably made of ceramic material. Stationary disk 216 includes opposing specially shaped apertures 218 which correspond with cutout regions 222 in rotating disk 220 when drive shaft 224 is in a first, open position, and which are blocked by solid regions 223 in rotating disk 220 when drive shaft 224 is in a second, closed position.

Stationary disk 216 is prevented from rotating within valve housing 228 by opposing retaining pins 230 set in corresponding slots 228b on the inner surface of the wall of valve housing 228. Stationary disk 216 is held in place in valve housing 228 when valve 202 is assembled by a retaining assembly 208 including an outer ring 214 which closely with interference fits in a bottom portion of valve housing 228 and surrounds a rubber expansion gasket 210. Rubber expansion gasket 210 is set in outer ring 214 and held in place by the outer ring. An inner ring 212 having projections 212a on the outside thereof helps stabilize the gasket. Retaining assembly 208 includes an inlet opening 206 in fluid communication with waterway inlets 140a and 140b on one side and apertures 218 on the other side. Rubber expansion gasket 210 extends slightly below the lower edge 228c of valve housing 228 and fluidly seals valve 202 in valve receiving portion 204 against the bottom 204a thereof.

Figure 15:
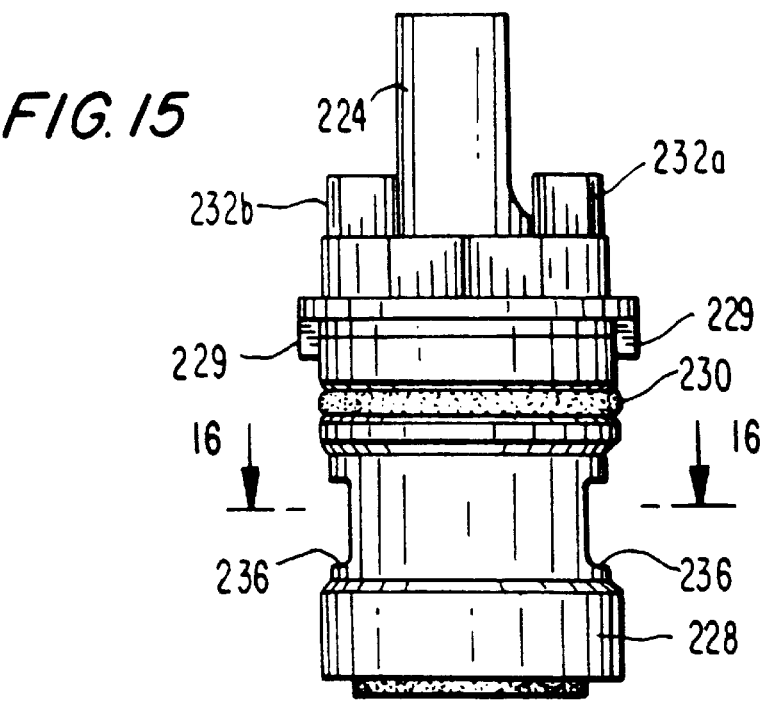
FIG. 15 is an elevational view of the water valve depicted in FIG. 14.
Figure 16:
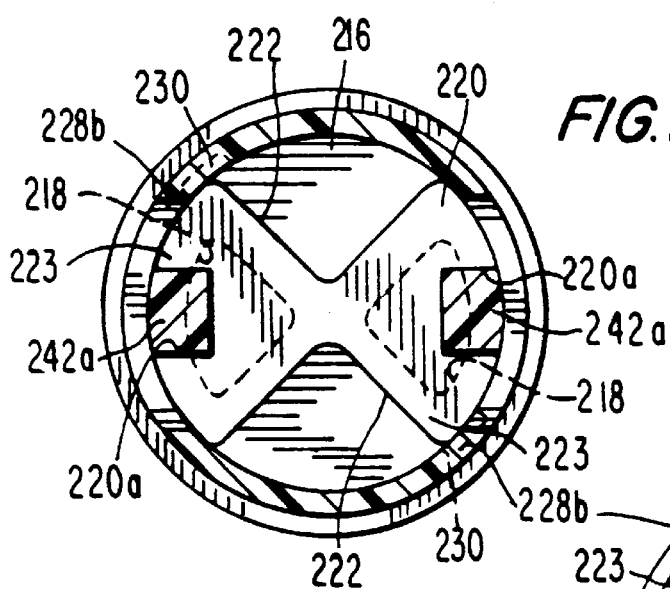
FIG. 16 is a sectional view taken along line 16–16 of FIG. 15.
Figure 17:
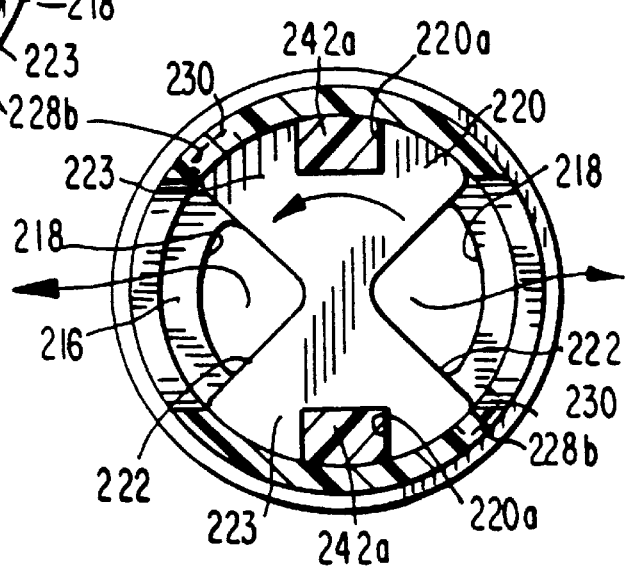
FIG. 17 is a sectional view similar to FIG. 16 but showing the valve components in a different orientation.

In the embodiment shown, valve 202 also includes two stops 232a and 232b on the top surface of housing 228 to be described below with reference additionally to FIGS. 18–27. FIG. 15 depicts valve 202 in an assembled condition. FIG. 16 shows a cross-section of assembled valve 202 when drive shaft 224 is in the second, closed position. FIG. 17 shows the valve in the first, open position. As can be seen, when drive shaft 224 is in the second, closed position, the solid regions 223 of rotating disk 220 sealingly cover and block apertures 218, thus preventing flow of water within valve 202 and waterway 136. However, when drive shaft 224 is rotated to the first, open position of FIG. 17, cutout regions 222 correspond with lower apertures 218 and permit water to flow from inlet portion 206 through the two disks 216 and 220 and to outlet portion 236, and to waterway spout 50, thus allowing fluid to flow through waterway 136.

The above-mentioned first open and second closed positions may be defined by stop members 232a and 232b on valve housing 228. Drive shaft 224 may also include two flat portions 240a and 240b on a handle mount portion 238. Flat portions 240a and 240b define about a 90° angle with respect to one another relative to the rotational axis, and mate and engage with a corresponding handle flat portion 248 of a handle 244.

Handle 244 includes blocking members 246a and 246b which abut stops 232 and limit the extent of maximum rotation in either the clockwise or counterclockwise direction.

Figure 11:
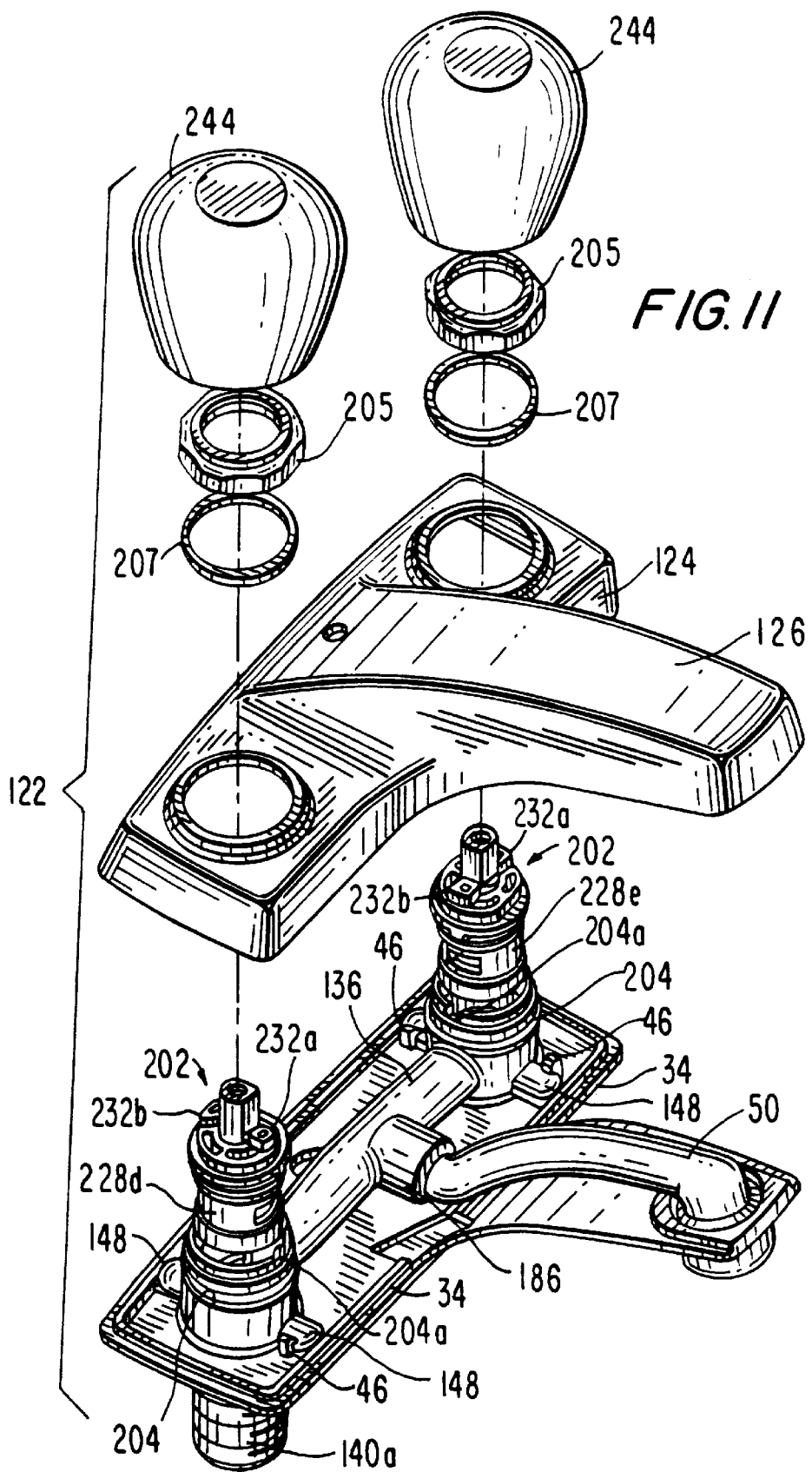
FIG. 11 is a top front left exploded view of the dual handle faucet fixture depicted in FIG. 10.
Figure 12:
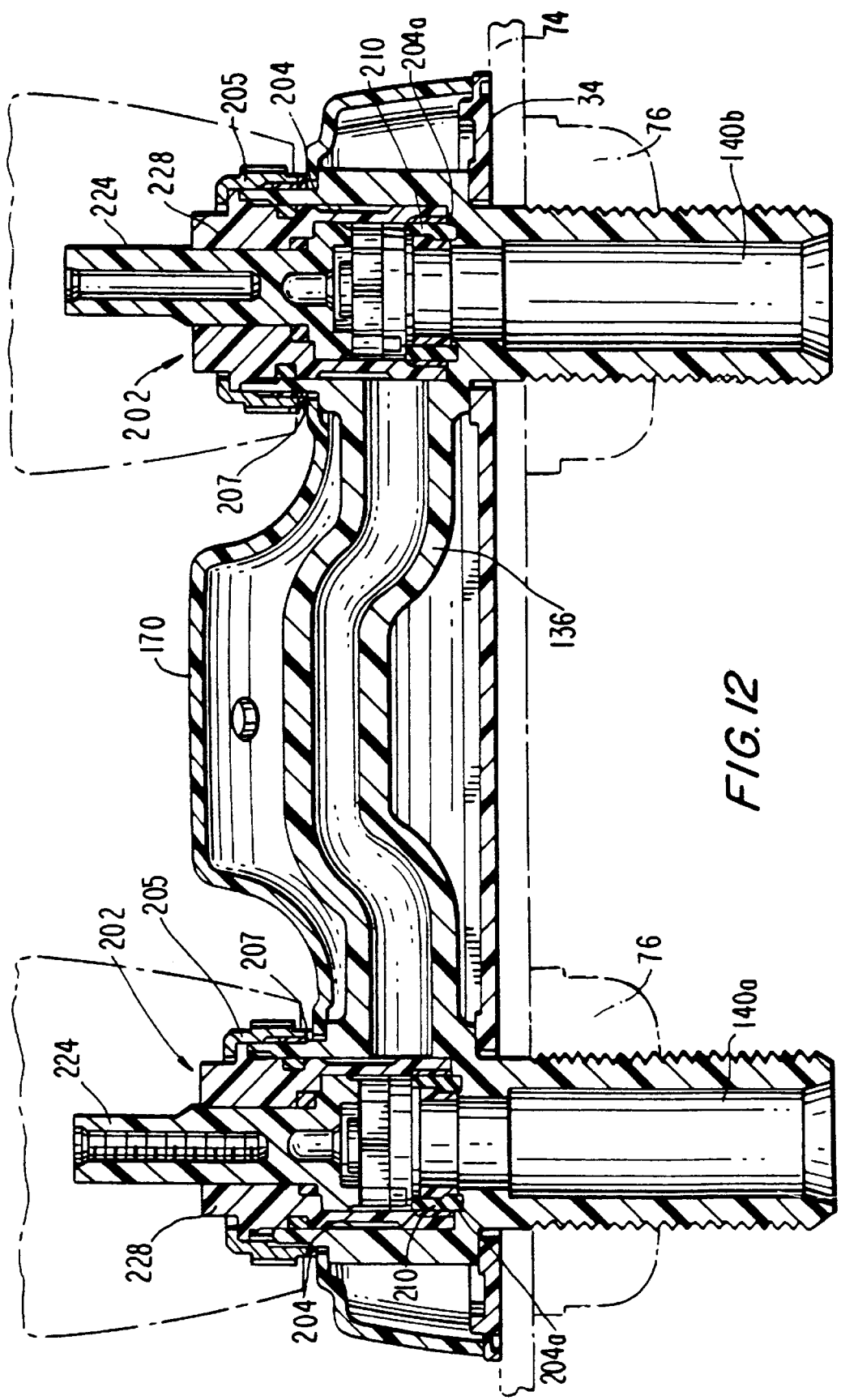
FIG. 12 is an enlarged sectional view taken along line 12–12 of FIG. 10.
Figure 13:
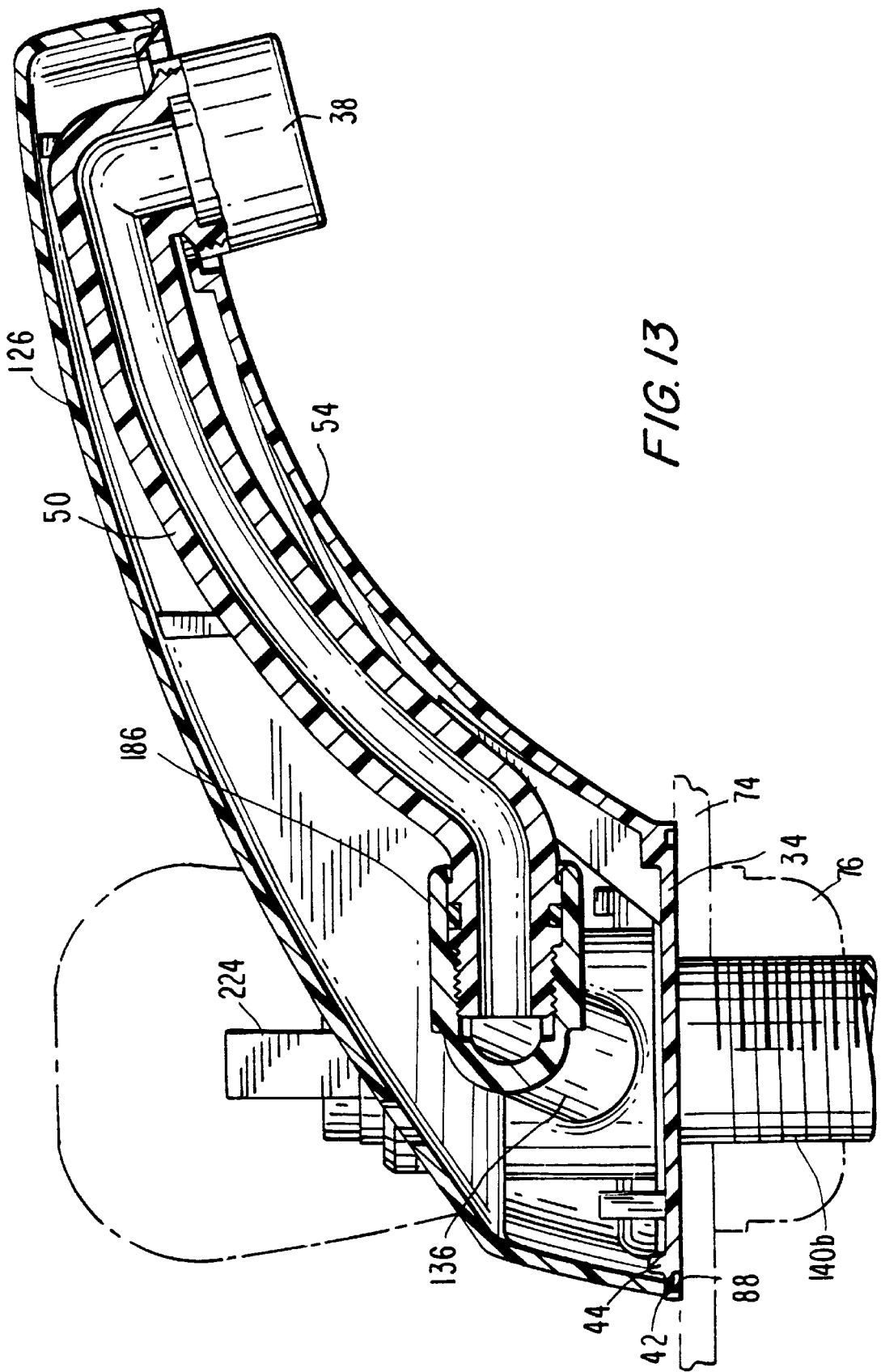
FIG. 13 is an enlarged sectional view taken along line 13–13 of FIG. 10.

As a result of dual stops 232a and 232b, dual blocking members 246a and 246b, and dual flat portions 240a and 240b, handle 244 can be mounted in one of two orientations (with handle flat portion 248 matingly engaged with either one of flat portion 240a and 240b) which thus allows rotation in either a clockwise or a counterclockwise direction to turn drive shaft 224 from the second closed position to the first open position. Moreover, as depicted in FIG. 11, the hot water valve housing 228d is oriented at a 90°displacement with respect to the cold water valve housing 228e. This placement orients the openings in the stationary disk on the hot side at a 90° displacement with respect to the openings on the stationary disk or cold side. This helps to assure proper handle placement and rotation during installation. Therefore, depending on the requirements of the sink installation, the very same valve and handle combination may be easily assembled and used to allow a clockwise (looking from down on top) rotation to open water flow, see FIGS. 19, 20 and 27, or to allow a counterclockwise (again looking down from on top) rotation, see FIGS. 22, 24 and 25, to open the water flow. This feature can be particularly useful where faucet handle 244 includes a long lever 254 which would collide with the spout if it were rotated towards the spout.

FIGS. 18 and 21 show cold water valve housing 228e (from FIG. 11) oriented with projections 232a and 232b in the horizontal direction. This also causes apertures 218 in stationary disk 216 to be oriented in the horizontal direction. When the components are oriented as depicted in FIGS. 18 and 21, the valve is closed since solid regions 223 of rotating disk 220 block apertures 218 in stationary disk 216. When handle 244 is positioned on drive shaft 224 with the flat 244a of handle 244 against flat portion 240a of drive shaft 224, as shown in FIG. 19, blocking members 246a and 246b in handle 244 will press against stop members 232a and 232b when handle 244 is rotated in a clockwise direction of arrow A as shown in FIG. 19 to close the valve. When handle 244 is rotated in the counterclockwise direction when the stop and blocking members are oriented as depicted in FIG. 19, the valve will be opened and water will flow.

On the other hand, when handle 244 is positioned on drive shaft 224 with the flat 244a of handle 244 against flat portion 240b of drive shaft 224 as depicted in FIG. 22, blocking members 246a and 246b in handle 244 will press against stop members 232a and 232b when handle 244 is rotated in a counterclockwise direction of arrow B to close the valve. Rotation of handle 244 in the clockwise direction when oriented as shown in FIG. 22, will cause the valve to open.

FIG. 20 depicts a handle 244 having a lever extension 254. When such a handle is used on the cold side, it is desirable to prevent clockwise rotation from the closed valve position shown in FIG. 20 so that lever extension 254 does not contact the faucet spout. Since the valve is based in the orientation of FIG. 20, only rotation in a counterclockwise direction will be allowed to open the valve.

FIGS. 23 and 26 show hot water valve housing 228d (from FIG. 11) oriented with projections 232a and 232b in the vertical direction. This also causes apertures 218 in stationary disk 216 to be oriented in the vertical direction. When the components are oriented as depicted in FIGS. 23 and 26, the valve is closed. When handle 244 is positioned on drive shaft 224 with the flat 244a of handle 244 against flat portion 240b of drive shaft 224, as shown in FIG. 24, blocking members 246a and 246b in handle 244 will press against stop members 232b and 232a when handle 244 is rotated in a counterclockwise direction of arrow C as shown in FIG. 24 to close the valve. When handle 244 is rotated in the clockwise direction when the stop and blocking members are oriented as depicted in FIG. 24, the valve will be opened and water will flow.

On the other hand, when handle 244 is positioned on drive shaft 224 with the flat 244a of handle 244 against flat portion 240a of drive shaft 224 as depicted in FIG. 27, blocking members 246a and 246b in handle 244 will press against stop members 232a and 232b when handle 244 is rotated in a clockwise direction of arrow D to close the valve. Rotation of handle 244 in the counterclockwise direction when oriented as shown in FIG. 27, will cause the valve to open.

FIG. 25 depicts a handle 244 having a lever extension 254. When such a handle is used on the hot side, it is desirable to prevent counterclockwise rotation from the closed valve position shown in FIG. 25 so that lever extension 254 does not contact the faucet spout. Since the valve is based in the orientation of FIG. 20, only rotation in a clockwise direction will be allowed to open the valve.

As noted, this construction is particularly beneficial for faucet handles having long levers attached, such as lavatory fixtures adapted for use by the handicapped. In this case, when it is desired that both hot and cold valves are in an off position when the levers are perpendicular to the faucet spout, with the hot water lever pointing to the left and the cold water lever pointing to the right, the change can be made by merely reorienting the respective handles on the respective drive shafts as described above. The hot water valve on the left hand side will then be turned on by rotating the lever in a counterclockwise direction and the cold water faucet on the right hand side will be turned on by rotating the faucet lever clockwise.

This unique valve construction and assembly which provides that the hot and cold water valves can be oriented so that one valve includes apertures essentially parallel to the spout and the other valve includes apertures essentially perpendicular to the spout allows for a single valve construction for both hot and cold sides, a single handle construction and a single valve body (including the waterway and valve receiving portion) to accomplish both clockwise and counterclockwise opening of the valve. Thus, the same system allows ready changeover from knob handles to lever handles and vice versa, without the need to remove or replace the valves.

The present invention provides a unique system for single and dual handle faucet with interchangeable components which have heretofore been unavailable. The system also provides several improved components, and reduces both manufacturing costs, and manufacturing and installation time.

It will thus be seen that the objects set forth above, among those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A water valve for a faucet fitting for controlling water flow comprising a valve housing having an inlet and an outlet, a stationary member positioned in said valve housing, a rotatable member cooperatively engaged with said stationary member, one of said stationary member and said rotatable member including an aperture and the other of said stationary member and rotatable member including means for selectively blocking the flow of water through said aperture, a shaft for rotating said rotable member, said relationship between said rotating member and said stationary member being such that each 90° rotation of said shaft from a predetermined position results in either said aperture being blocked to close said valve or said aperture being unblocked to open said valve, said shaft permitting a handle to be selectively supported thereon in a first orientation and in a second orientation, wherein said shaft includes a handle mount portion having first and second flat portions which are essentially perpendicular to one another, said first and second flat portions defining said first and second orientations, said shaft being rotatable by said handle in a first direction to open said valve by unblocking said aperture when said handle is in said first orientation, said shaft being rotatable by said handle in said first direction to close said valve by blocking said aperture when said handle is in said second orientation.

2. The water valve as claimed in claim 1, wherein said valve housing includes at least a first stop and said handle includes at least a first blocking member which cooperates with said first stop to define said first direction of rotation.

3. The water valve as claimed in claim 2, wherein said valve housing includes a second stop positioned essentially 180° from said first stop.

4. The water valve as claimed in claim 3, wherein said first blocking member cooperates with said first and second stops to define the direction of rotation which opens and closes said valve.

5. The water valve as claimed in claim 2, wherein said valve housing is securable in a waterway having a hot water side and a cold water side, a first valve housing being supported in said waterway to control said hot water side, and a second valve housing being supported in said waterway to control said cold water side, said first valve housing being oriented at a 90° rotation with respect to said second valve housing.

6. The water valve as claimed in claim 5, wherein said aperture extends in a first direction.

7. The water valve as claimed in claim 1, further comprising a handle including a recessed portion having a flat surface which selectively mates with said first flat portion to define said first orientation and said second flat portion to define said second orientation.

8. A water valve system for a dual handle fitting having a waterway including a hot water side valve aperture and a cold water side valve aperture, comprising first and second valves of similar construction, said first valve being supported in said hot water side valve aperture in a first position, said second valve being supportable in said cold water side valve aperture in a second position, wherein said first position is essentially a 90° angular displacement with respect to said second position, a first handle for controlling said first valve and a second handle for controlling said second valve, said first and second handles being of similar construction, said first handle being supportable on said first valve in a first orientation to open said first valve when rotated in a clockwise direction and to close said first valve when rotated in a counterclockwise direction, said first handle being supportable on said first valve in a second orientation to open said first valve when rotated in a counterclockwise direction and to close said first valve when rotated in a clockwise direction.

9. The water valve system as claimed in claim 8, wherein said second handle is supportable on said second valve in a third orientation to open said second valve when rotated in a clockwise direction and to close said second valve when rotated in a counterclockwise direction, said second handle being supportable on said second valve in a second orientation to open said second valve when rotated in a counterclockwise direction and to close said second valve when rotated in a clockwise direction.

10. The water valve system as claimed in claim 9, wherein said first handle includes a first lever and said second handle includes a second lever.

11. The water valve system as claimed in claim 10, wherein said fitting includes a spout intermediate said hot and cold water side valve apertures, said first handle being supportable on said first valve so that said first lever extends away from and essentially perpendicular to said spout when said first valve is closed, said first lever being rotatable towards said spout to open said first valve.

12. The water valve system as claimed in claim 11, wherein said second handle is supportable on said second valve so that said second lever extends away from and essentially perpendicular to said spout when said first valve is closed, said second lever being rotatable towards said spout to open said second valve.

13. The water valve as claimed in claim 1, wherein said shaft further includes a curved portion.

14. The water valve system as claimed in claim 8, wherein said waterway is provided with at least a first slot proximate said hot water side valve aperture and with at least a second slot proximate said cold water side valve aperture, wherein said first valve has at least a first projection and said second valve has at least a second projection, and wherein said first projection fits in said first slot and said second projection fits in said second slot.

\* \* \* \* \*